Aug. 28, 1951 R. G. LE TOURNEAU 2,566,088
PORTABLE ADJUSTABLE TRAVERSIBLE-BOOM TREE SAW
Filed May 28, 1948 2 Sheets-Sheet 1
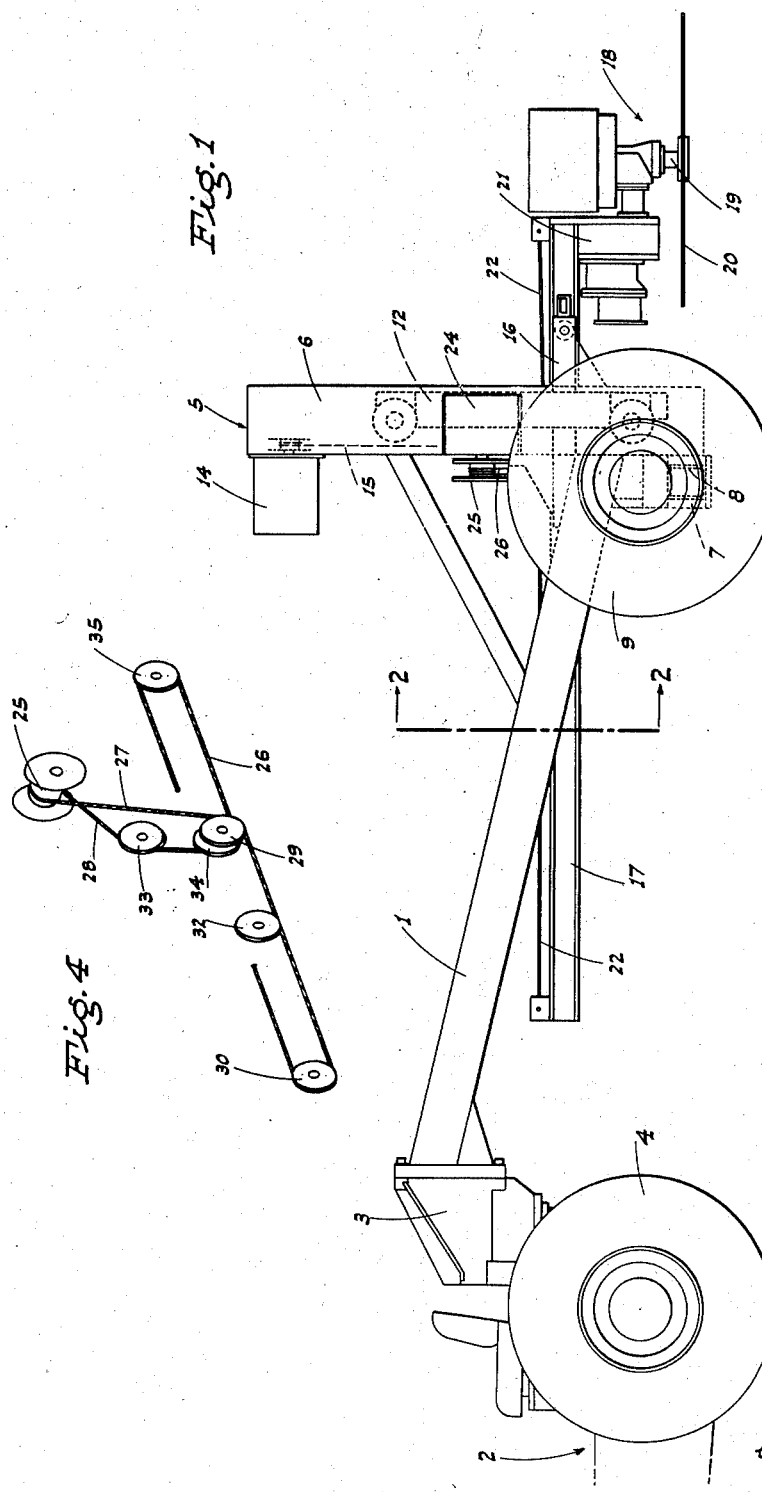
INVENTOR
R.G.LeTourneau
ATTORNEYS Aug. 28, 1951  R. G. LE TOURNEAU  2,566,088
PORTABLE ADJUSTABLE TRAVERSIBLE-BOOM TREE SAW
Filed May 28, 1948  2 Sheets-Sheet 2
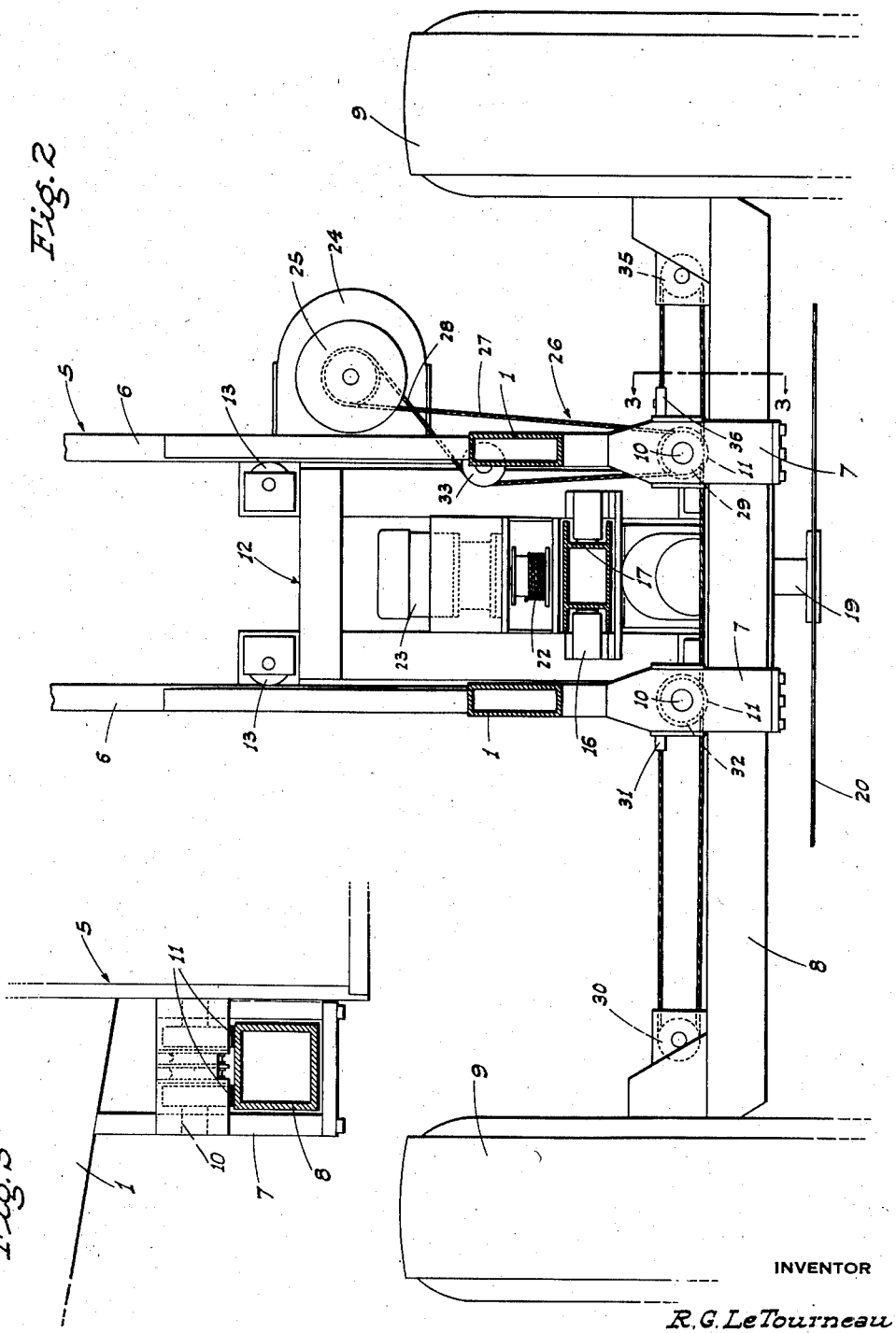
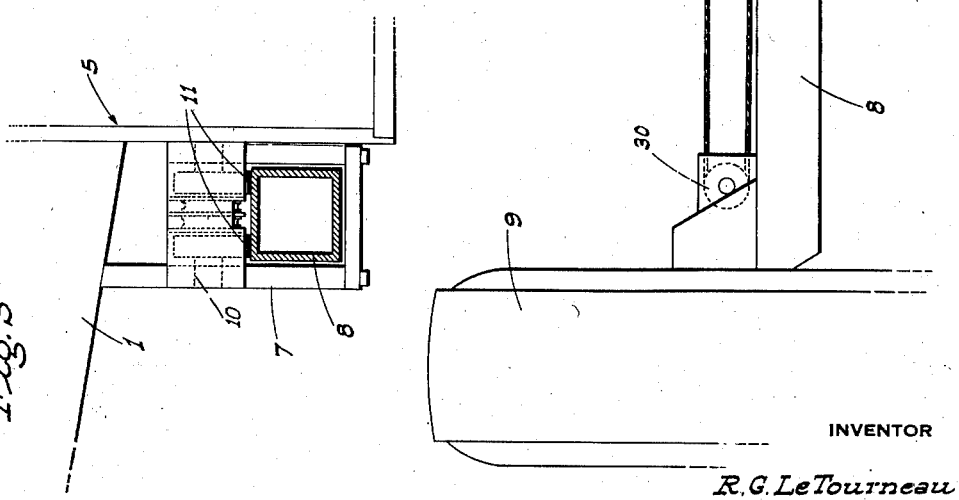
INVENTOR
R. G. LeTourneau
BY
ATTORNEYS Patented Aug. 28, 1951

2,566,088

UNITED STATES PATENT OFFICE 2,566,088

PORTABLE ADJUSTABLE TRAVERSABLE-BOOM TREE SAW

Robert G. Le Tourneau, Longview, Tex., assignor to R. G. Le Tourneau, Inc., Stockton, Calif., a corporation of California Application May 28, 1948, Serial No. 29,735

1 Claim. (Cl. 143—43)

This invention is directed to, and it is an object to provide, improvements in the portable, power actuated tree saw shown in copending application, Serial No. 703,575, filed October 16, 1946, issued January 16, 1951 as Patent No. 2,538,371.

In such prior implement the power driven, circular saw unit is carried on a longitudinal boom vertically adjustable in an elevator frame; the latter being non-adjustably secured at the lower end on a wheel-supported axle structure.

It has been found desirable that the elevator frame be mounted for adjustment along the axle structure transversely of the implement, whereby to impart a lateral range of motion to the saw and to consequently improve its operational characteristics.

It is thus an additional object of the invention to provide the tree saw with such a transverse adjustment of the elevator frame on the axle structure.

Another object of the invention is to provide a novel power actuated cable system to accomplish the aforesaid transverse adjustment of the elevator frame of the implement.

A further object of the invention is to provide a practical and reliable adjustment arrangement for a portable tree saw, and one which will be exceedingly effective for the purpose for which it is designed.

These objects are accomplished by means of such structure and relative arrangement of parts as will fully appear by a perusal of the following specification and claim.

In the drawings:

Fig. 1 is a side elevation of the portable, adjustable tree saw embodying the present invention.

Fig. 2 is a cross section on line 2—2 of Fig. 1, looking in the direction of the saw unit.

Fig. 3 is a cross section on line 3—3 of Fig. 2.

Fig. 4 (Sheet 1) is a diagram of the novel cable system employed to effect the transverse adjustment of the elevator frame and the parts carried thereon.

Referring now more particularly to the characters of reference on the drawings, the implement comprises a rigid elongated body 1 disposed some distance above ground and connected, at one end, with a two-wheel tractor, shown in part at 2, by means of a coupling and power steering unit 3. The tractor 2 includes a pair of transversely spaced, pneumatic-tire wheels 4.

At the end opposite the tractor 2 the rigid body 1 is fixed in connection with an upstanding elevator frame, indicated generally at 5; said elevator frame including transversely spaced vertical side beams 6 connected together by suitable framing. The elevator frame is supported—at its lower end—by a pair of transversely spaced guide boxes 7 which surround a transverse axle 8 which is rectangular in cross section. The outer ends of the transverse axle 8 carry pneumatic-tire wheels 9.

The guide boxes 7 are fitted therein, and above the axle 8, with cross pins 10, each of which carries a pair of spaced rollers 11 which ride the top of said axle 8.

The upstanding elevator frame 5 is fitted therein with an elevator carriage 12 having rollers 13 which ride in the side beams 6; such elevator carriage being vertically adjustable by means of a reversible electric winch unit 14 on the elevator frame in actuating relation to a cable system shown in part at 15, connected to the elevator carriage. Thus, operation of the electric winch unit 14 in one direction or the other raises or lowers the elevator carriage 12.

The elevator carriage 12 supports, in longitudinally slidable relation by means of a slide mount, indicated at 16, an elongated horizontal boom 17, the outer or free end of such boom being fitted with a power driven circular saw unit, indicated generally at 18. This power driven circular saw unit 18 includes a depending spindle 19 having a circular saw 20 of relatively large diameter secured thereto; the spindle 19 being driven by an electric motor assembly 21.

The boom 17 is adjustable, with respect to its extent of projection outwardly from the axle 8, by means of an actuating cable system, shown in part at 22, and which cable system is driven by a reversible electric winch unit 23 mounted in said elevator carriage 12. By running the winch unit 23 in one direction the boom 17 is advanced, while running the winch in the opposite direction retracts said boom.

Under certain working conditions it is desirable to effect a transverse adjustment or travel of the circular saw 20, and in the present implement this result is attained by shifting the upstanding elevator frame 5 along the axle 8 in one direction or the other. The power mechanism employed to accomplish this transverse shifting of the elevator frame 5 comprises the following:

A reversible electric winch unit, indicated generally at 24, is mounted exteriorly on one of the side beams 6 of the elevator frame 5; such winch unit including a cable drum 25. A relatively long cable 26 is wound, intermediate its ends, about the cable drum 25 and extends therefrom as a pair of actuating reaches 27 and 28, respectively. The reach 27 extends downwardly from the cable drum 25 and passes beneath a sheave 29 on the adjacent cross pin 10 between the rollers 11, and thence said reach 27 runs along the top of the axle 8 to its opposite end; there turning about a direction changing sheave 30 and returning to anchor to the near guide box 7, as at 31. The cross pin 10 in said near guide box carries a sheave 32 between the rollers 11 to further guide said reach 27.

The reach 28 is reeved as follows:

After leaving the cable drum 25, the reach 28 crosses the reach 27 and turns downward about an idler sheave 33 on the adjacent side beam 6. From the idler sheave 33 the reach 28 runs downward and turns under another sheave 34 on the same cross pin 10 that carries the sheave 29; the sheave 34 likewise being on said pin between the adjacent rollers 11.

From the sheave 34 the reach 28 extends along the axle 8 in a direction opposite the corresponding portion of the reach 27, and at the end of the axle turns about a direction-changing sheave 35, and thence returns to anchor to the adjacent guide box 7, as at 36.

With the above arrangement operation of the winch unit 24 and cable drum 25 in one direction or the other will cause transverse travel of the elevator frame 5 in a corresponding direction on the axle 8. In this way the circular saw 20 can be shifted transversely of the implement so as to impart a cross cut to an engaged tree, without having to move the implement. There will, of course, be some slight pivotal movement of the implement at the points of wheel contact with the ground, but this is not disadvantageous for any reason.

Adjustment of the circular saw 20 transversely, as described, is particularly beneficial for the making of undercuts on one side of a tree prior to felling the latter by cutting on the opposite side.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claim.

Having thus described the invention, the following is claimed as new and useful, and upon which Letters Patent are desired:

A portable power actuated tree saw comprising a mobile supporting vehicle which includes a transverse axle, an upstanding frame mounted for sliding movement along the axle, a reversible motor driven cable winch mounted on said frame, a sheave mounted on the axle adjacent each end thereof, a pair of vertically spaced sheaves on the frame below the winch, a separate single sheave on the frame below the winch, a cable wound about the winch drum and having two reaches extending therefrom, one reach being reeved over the two sheaves on the frame thence about the sheave at one end of the axle and then being then dead ended on the frame, the other reach being reeved over the separate single sheave on the frame thence over the sheave at the other end of the axle and being then dead ended on the frame, such winch and cable assembly being operable to selectively move the frame back and forth transversely of the longitudinal axis of the vehicle, a boom mounted on the frame and projecting longitudinally of the vehicle and beyond one end thereof, and a driven vertical axis circular saw supported on the outer end of the boom, the working edge of the saw projecting in the clear beyond such outer end of the boom.

ROBERT G. LE TOURNEAU.

REFERENCES CITED

The following references are of record in the file of this patent:

UNITED STATES PATENTS

| Number | Name | Date |
| --- | --- | --- |
| 910,145 | O'Hara | Jan. 19, 1909 |
| 1,182,976 | Conner et al. | May 16, 1916 |
| 2,404,655 | Randall | July 23, 1946 |
| 2,406,300 | Le Tourneau | Aug. 20, 1946 |
| 2,426,694 | King | Sept. 2, 1947 |

FOREIGN PATENTS

| Number | Country | Date |
| --- | --- | --- |
| 350,280 | Germany | Mar. 17, 1922 |